United States Patent
Landgraf et al.

[11] Patent Number: 5,945,372
[45] Date of Patent: Aug. 31, 1999

[54] CATALYST FOR REACTING ORGANIC COMPOUNDS PRESENT IN A GAS MIXTURE

[75] Inventors: Norbert Landgraf, Rückersdorf; Erich Hums, Hessdorf, both of Germany

[73] Assignee: Siemens Aktiengesellschaft, Muenchen, Germany

[21] Appl. No.: 08/951,208

[22] Filed: Sep. 17, 1997

Related U.S. Application Data

[63] Continuation of application No. PCT/DE96/00431, Mar. 11, 1996.

Foreign Application Priority Data

Mar. 17, 1995 [DE] Germany .......................... 195 09 893

[51] Int. Cl.$^6$ .............................. B01J 21/06; B01J 23/22
[52] U.S. Cl. ........................................... 502/350; 502/353
[58] Field of Search ..................... 502/350, 351, 502/353

[56] References Cited

U.S. PATENT DOCUMENTS

| | | | |
|---|---|---|---|
| 3,917,682 | 11/1975 | Mizukami et al. | 260/533 R |
| 5,215,953 | 6/1993 | Blumrich et al. | 502/218 |
| 5,527,755 | 6/1996 | Wenski et al. | 502/325 |

FOREIGN PATENT DOCUMENTS

| | | |
|---|---|---|
| 0264747A1 | 4/1988 | European Pat. Off. . |
| 0290947A1 | 11/1988 | European Pat. Off. . |
| 0394677A1 | 10/1990 | European Pat. Off. . |
| 0453674A1 | 10/1991 | European Pat. Off. . |
| 2401160 | 8/1974 | Germany . |
| 3804722A1 | 8/1989 | Germany . |

*Primary Examiner*—Steven Bos
*Assistant Examiner*—Alexander G. Ghyka
*Attorney, Agent, or Firm*—Herbert L. Lerner; Laurence A. Greenberg

[57] ABSTRACT

A particularly thermally stable and acid resistant catalyst for reacting organic compounds present in a gas mixture, e.g. hydrocarbons, halogenated hydrocarbons, alcohols and solvents, includes titanium oxide, vanadium oxide and at least one further catalytically active component. The titanium oxide is predominantly present as titanium dioxide $TiO_2$ of the rutile type having a BET surface area of greater than 40 m$^2$/g. The catalyst can be used for purifying combustion waste gases of all types and for purifying industrial waste air.

9 Claims, 1 Drawing Sheet

5,945,372

CATALYST FOR REACTING ORGANIC COMPOUNDS PRESENT IN A GAS MIXTURE

CROSS-REFERENCE TO RELATED APPLICATION

This application is a continuation of International Application Serial No. PCT/DE96/00431, filed Mar. 11, 1996.

BACKGROUND OF THE INVENTION

Field of the Invention

The invention relates to a catalyst including titanium oxide, vanadium oxide and at least one further catalytically active component for reacting organic compounds present in a gas mixture.

For the purposes of the present invention, organic compounds are generally hydrocarbons, solvents, carbon monoxide, cyclic and aromatic compounds as well as halogenated hydrocarbons, in particular dioxins and furans. Such gas mixtures can be, for example, automobile exhaust gases, waste air from industry, exhaust gases of stationary combustion engines and flue gases from combustion plants, e.g. power stations and waste incineration plants.

German Published, Non-Prosecuted Patent Application DE 38 04 722 A1 discloses a process and a catalyst for eliminating organic compounds from a waste gas. With regard to the process, it is disclosed that the waste gas containing the organic compound is fed together with oxygen, in particular together with air, within a prescribed temperature range, for example from 250 to 500° C., to a selective catalyst which converts the organic compound into environmentally compatible reaction products such as carbon dioxide and water vapor. The acid resistance is an advantage specifically in the case of dioxin/furan degradation (formation of HCl, HF). A catalyst which is preferred in that case is a catalyst including a mixture of oxides. The catalyst under consideration in that case includes a large proportion by weight of titanium dioxide, preferably in the anatase crystal form. Compounds and/or oxides and/or mixed oxides of the transition metals chromium, manganese, cobalt, nickel, copper, vanadium, zinc, molybdenum and tungsten, but preferably chromium oxide, are added to the titanium dioxide as components which are particularly catalytically active.

Furthermore, Published European Patent Application 0 290 947 A1 discloses a catalyst for the oxidation of ammonia ($NH_3$). That catalyst too includes a considerable proportion by weight of up to 50% of titanium dioxide which should preferably be present in the anatase crystal modification. That is because the anatase modification usually has a higher BET surface area than the rutile modification. Such a catalyst has a high catalytic activity due to the high BET surface area. German Published, Non-Prosecuted Patent Application DE 38 04 722 A1 and Published European Patent Application 0 290 947 A1 disclose a process for producing such a catalyst for the degradation of organic compounds. In that process, titanium dioxide is milled and intimately mixed with the active components and filtered. A binder is added to the resulting filter cake and the resulting mass is mixed and made into a predetermined shape, e.g. applied to plates or extruded to form honeycombs or pellets. The shaped composition is subsequently dried and subjected to a heat treatment or calcined.

The reaction that is carried out using such a catalyst is exothermic and for that reason the reaction can result in local overheating, known as hot spots, in the catalyst. Since the catalyst is formed predominantly of titanium dioxide of the anatase type, the specific surface area of the catalyst is irreversibly decreased by those hot spots because titanium dioxide of the anatase type is transformed into the rutile type with a change in the particle size. That results in the activity of the catalyst becoming worse with increasing operating time.

As an alternative to titanium dioxide as the base material for the catalyst, it is also known that a catalyst can be made up on the basis of aluminum oxide. Such a catalyst including aluminum oxide has little susceptibility to temperature stresses, in particular to hot spots. However, it has been found when using such a catalyst that, in contrast to titanium dioxide catalysts having the customary anatase modification, the catalyst does not have sufficient acid resistance, particularly in the degradation of halogenated hydrocarbons.

Furthermore, Published European Patent Application 0 264 747 A1 discloses a $V_2O_5$—$TiO_2$ catalyst for reacting o-xylene in which the titanium oxide is present in the rutile form. In addition, German Published, Non-Prosecuted Patent Application 2 401 160 discloses a $V_2O_5$—$TiO_2$ catalyst for the gas-phase oxidation of butene to give acetic acid, where more than 50% of the titanium dioxide is in the rutile form.

SUMMARY OF THE INVENTION

It is accordingly an object of the invention to provide a catalyst for reacting organic compounds present in a gas mixture, which overcomes the hereinafore-mentioned disadvantages of the heretofore-known products of this general type and which is particularly thermally stable and acid-resistant.

With the foregoing and other objects in view there is provided, in accordance with the invention, a catalyst for reacting organic compounds present in a gas mixture, comprising titanium oxide present as titanium dioxide $TiO_2$ of the rutile type and of the anatase type, the titanium oxide of the rutile type having a BET surface area of greater than 40 $m^2/g$, and the titanium dioxide $TiO_2$ of the rutile type having a proportion of more than 50% by weight, based on a total weight of the titanium oxide; vanadium oxide; and at least one further catalytically active component other than cobalt and silicon oxide.

The use of titanium dioxide as a base material for the catalyst achieves particularly good acid resistance of the catalyst which exceeds the acid resistance of a catalyst including titanium dioxide in the anatase modification as a base material for the catalyst. The use of titanium dioxide of the rutile type, which compared with titanium dioxide of the anatase type is subject to very little or no grain growth at high temperatures, also achieves a particularly high thermal stability. The thermal stability is due to the fact that titanium dioxide of the rutile type, even at temperature peaks in the range from 700 to 1000° C., has virtually no grain growth which would lead to a decrease in the specific surface area, as is the case for titanium dioxide of the anatase type. The use of titanium dioxide of the rutile type is all the more remarkable because a person skilled in the art would usually rule out the use of titanium dioxide of the rutile type since titanium dioxide in the rutile modification is normally used only for the production of white pigments and is therefore as a rule obtainable only with a relatively low specific surface area of about 10 $m^2/g$. In contrast, titanium dioxide of the anatase type having a relatively high specific surface area of 100 $m^2/g$ is also commercially available.

In accordance with another feature of the invention, with regard to the thermal stability, it is particularly advantageous for the proportion of titanium dioxide $TiO_2$ of the anatase type to be less than 25% by weight, based on the total weight of the titanium dioxide used.

In accordance with a further feature of the invention, the catalytic activity of the catalyst becomes particularly high if a compound or a plurality of compounds of the elements molybdenum, tungsten, vanadium, copper, iron, chromium and manganese is or are provided as catalytically active component.

In accordance with an added feature of the invention, compounds which are particularly suitable for this purpose are copper-manganese spinels, copper chromites, chromium oxides, manganese chromites and iron oxide together with vanadium pentoxide.

For cost reasons and because of technical considerations, the catalyst should not have an unrestricted high proportion of the catalytically active component. Therefore, in accordance with an additional feature of the invention, the proportion of the catalytically active component does not exceed 20% by weight and is preferably from 2 to 10% by weight.

In accordance with a concomitant feature of the invention, the catalyst is particularly practical in terms of handling if it is in honeycomb form or in pellet and/or granule form.

In principle, a catalyst according to the present invention can be produced by the method mentioned in the introduction under the same conditions as are also customary for the production of a catalyst known from the prior art for removing organic compounds from waste gases.

Titanium dioxide is gradually and upon increasing the temperature more quickly transformed irreversibly from the anatase modification into the rutile modification. However, when the temperature is increased no change in the particle size of the rutile takes place. It can therefore be assumed that the catalyst has a ratio of titanium dioxide in the rutile modification to titanium dioxide in the anatase modification which is the same as or greater than that in the starting material added at the beginning.

Titanium dioxide in the rutile modification having a BET surface area of greater than 40 $m^2/g$ can be prepared by processes which are largely the same as those known for the rutile having a BET surface area of about 10 $m^2/g$ that are manufactured for white pigments. Such processes are, for example, precipitation from titanyl sulfate or oxidative combustion of titanium tetrachloride. It may be necessary to make appropriate changes in the crystallization rate in order to achieve suitable particle sizes.

Other features which are considered as characteristic for the invention are set forth in the appended claims.

Although the invention is illustrated and described herein as embodied in a catalyst for reacting organic compounds present in a gas mixture, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
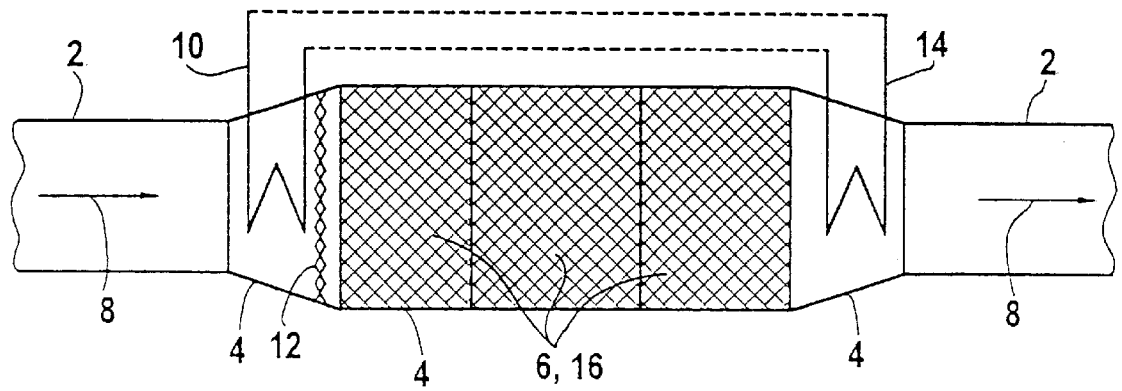
FIG. 1 is a fragmentary, diagrammatic, longitudinal-sectional view of a waste air line with a catalyst for reacting organic compounds.

Referring now to the figures of the drawings in detail and first, particularly, to FIG. 1 thereof, there is seen a waste air line 2 which is part of an industrial plant that is not shown further herein. The waste air line 2 has a widening 4 and a catalyst 6 installed in the region of the widening. A heat exchanger 10 and a mixing insert 12 are disposed upstream of the catalyst 6 in the flow direction of waste air 8 in the widening 4. A further heat exchanger 14 is disposed downstream of the catalyst 6 in the flow direction of the waste air 8, in the region of the widening 4. The further heat exchanger 14 together with the heat exchanger 10 can be configured as a recuperative heat exchanger as is indicated by broken lines. When reacting halogenated hydrocarbons, in particular dioxins and furans formed during the incineration of waste, an additional separator, which is not shown herein, for acid reaction products such as HCl and HF, may be necessary.

The waste air 8 flowing through the waste air line 2 is contaminated with organic compounds. These are, inter alia, alcohols, solvents, toluene and xylene. Before entry into the widening 4, the waste air has a temperature of about 20° C., an otherwise normal air composition and a volume flow of about 10,000 $Nm^3/h$.

Figure 2:
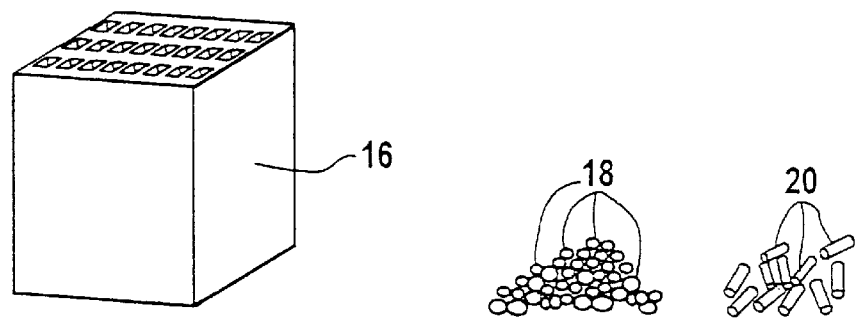
FIG. 2 is a perspective view showing possible embodiments of the catalyst used in FIG. 1.

In the illustrated example, the catalyst 6 is formed of ceramic honeycomb bodies 16, such as that shown in FIG. 2. Such a honeycomb body 16 usually has a cell count of from 4 to 78 cells/$cm^2$ (corresponds to from 25 to 500 cells/$inch^2$). The honeycomb body 16 in the example includes about 90% by weight of titanium dioxide, with about 95% by weight of the titanium dioxide being of the rutile type and about 5% being of the anatase type. The honeycomb body 16 further includes about 3% by weight of fiber material, e.g. glass fibers or fibers of aluminum oxide and/or silicon oxide, to increase the mechanical strength.

The remaining 7% by weight of the catalyst 6 is essentially catalytically active substances of the catalyst 6. These are 2% by weight of iron oxide $Fe_2O_3$, 2% by weight of vanadium pentoxide $V_2O_5$ plus 1% by weight of spinels of each of the systems copper-manganese, copper-chromium and manganese-chromium having the empirical formulae $CuMn_2O_4$, $CuCr_2O_4$ and $MnCr_2O_4$.

The waste air 8 is heated to about 200° C. through the use of the heat exchanger 10. The waste air 8 is mixed through the use of the mixing insert 12 located downstream of the heat exchanger 10, resulting in a homogeneous temperature distribution in the waste air 8 over the entire cross section of the widening 4. The contacting of the above-mentioned organic compounds with the catalyst 6 converts those compounds into largely environmentally compatible substances, e.g. carbon dioxide and water.

The waste air leaving the catalyst 6 is free of harmful organic compounds when the catalyst 6 is dimensioned appropriately. For this purpose, the volume of the catalyst 6 should be selected in such a way that the volume flow of waste air 8 passed through it in one hour does not exceed 50,000 times the volume of the catalyst, i.e. the space velocity of the waste air is a maximum of 50,000 per hour. The space velocity of the waste air should preferably be from 500 to 10,000 per hour.

The heat previously introduced into the waste air 8 through the use of the heat exchanger 10 is removed again from the waste air through the use of the heat exchanger 14. This heat can be returned to the heat exchanger 10. Alternatively, the waste air line 2 after leaving the catalyst 6 can be conducted through the heat exchanger 10 if it is configured as a recuperative heat exchanger.

The catalyst 6 has a particularly high acid resistance, thermal stability and catalytic activity due to the choice of titanium dioxide of the rutile type having a specific surface area, which is also referred to as a BET surface area, of greater than 80 m$^2$/g. The acid resistance is further increased by the use of titanium dioxide of the rutile type and the thermal stability is achieved by the high proportion of titanium dioxide of the rutile type. The high catalytic activity is achieved, on one hand, by the selection of a BET surface area of greater than 40 m$^2$/g and, on the other hand, by the selection of the catalytically active components.

FIG. 2 shows alternatively shaped catalyst bodies 18 and 20, in addition to the honeycomb catalyst 16. These are catalyst granules 18 and catalyst pellets 20. The catalyst granules 18 can be, for example, spheres having a diameter of from about 1 to 5 mm. The pellets 20 usually have a diameter of from about 1 to 5 mm and a length of from about 5 to 30 mm.

We claim:

1. A catalyst for reacting organic compounds present in a gas mixture, comprising:

titanium oxide present as titanium dioxide TiO$_2$ of the rutile modification and of the anatase modification, said titanium oxide of the rutile modification having a BET surface area of greater than 40 m$^2$/g, and said titanium dioxide TiO$_2$ of the rutile modification having a proportion of more than 50% by weight, based on a total weight of the titanium oxide;

vanadium oxide; and at least one further catalytically active component other than cobalt and silicon oxide.

2. The catalyst according to claim 1, wherein said titanium dioxide TiO$_2$ of the anatase modification has a proportion of less than 25% by weight, based on the total weight of the titanium oxide.

3. The catalyst according to claim 1, wherein said at least one further catalytically active component is at least one compound of elements selected from the group consisting of molybdenum, tungsten, copper, iron, chromium and manganese.

4. The catalyst according to claim 3, wherein said at least one further catalytically active component is at least one compound selected from the group consisting of copper-manganese spinels, copper chromites, chromium oxides, manganese chromites and iron oxide.

5. The catalyst according to claim 1, wherein said at least one further catalytically active component has a proportion of at most 20% by weight.

6. The catalyst according to claim 1, wherein said at least one further catalytically active component has a proportion of from 2 to 10% by weight.

7. A honeycomb catalyst for reacting organic compounds present in a gas mixture, comprising:

titanium oxide present as titanium dioxide TiO$_2$ of the rutile modification and of the anatase modification, said titanium oxide of the rutile modification having a BET surface area of greater than 40 m$^2$/g, and said titanium dioxide TiO$_2$ of the rutile modification having a proportion of more than 50% by weight, based on a total weight of the titanium oxide;

vanadium oxide; and at least one further catalytically active component other than cobalt and silicon oxide.

8. A pellet catalyst for reacting organic compounds present in a gas mixture, comprising:

titanium oxide present as titanium dioxide TiO$_2$ of the rutile modification and of the anatase modification, said titanium oxide of the rutile modification having a BET surface area of greater than 40 m$^2$/g, and said titanium dioxide TiO$_2$ of the rutile modification having a proportion of more than 50% by weight, based on a total weight of the titanium oxide;

vanadium oxide; and at least one further catalytically active component other than cobalt and silicon oxide.

9. A granule catalyst for reacting organic compounds present in a gas mixture, comprising:

titanium oxide present as titanium dioxide TiO$_2$ of the rutile modification and of the anatase modification, said titanium oxide of the rutile modification having a BET surface area of greater than 40 m$^2$/g, and said titanium dioxide TiO$_2$ of the rutile modification having a proportion of more than 50% by weight, based on a total weight of the titanium oxide;

vanadium oxide; and at least one further catalytically active component other than cobalt and silicon oxide.

\* \* \* \* \*